US005849386A

United States Patent [19]

Lal et al.

[11] Patent Number: 5,849,386

[45] Date of Patent: Dec. 15, 1998

[54] MAGNETIC RECORDING MEDIUM HAVING A PRELAYER

[75] Inventors: Brij Bihari Lal, San Jose; Sudhir S. Malhotra, Fremont; Michael A. Russak, Los Gatos, all of Calif.

[73] Assignee: HMT Technology Corporation, Fremont, Calif.

[21] Appl. No.: 908,289

[22] Filed: Aug. 7, 1997

Related U.S. Application Data

[63] Continuation-in-part of Ser. No. 634,895, Apr. 26, 1996, which is a continuation-in-part of Ser. No. 825,471, Mar. 28, 1997, which is a continuation-in-part of Ser. No. 887,348, Jul. 2, 1997.

[51] Int. Cl.$^{6}$ .......... G11B 5/66

[52] U.S. Cl. .......... 428/65.3; 478/65.7; 478/336; 478/611; 478/635; 478/667; 478/678; 478/680; 478/681; 478/694 T; 478/694 TM; 478/694 TS; 478/694 TP; 478/900; 204/192.2; 427/127; 427/128; 427/130; 427/131; 427/132

[58] Field of Search .......... 428/694 T, 694 TM, 428/694 TS, 694 TP, 336, 635, 667, 678, 680, 681, 611, 65.3, 65.7, 900; 204/192.2; 427/127, 128, 130, 131, 132

[56] References Cited

U.S. PATENT DOCUMENTS

| | | | |
|---|---|---|---|
| 5,456,978 | 10/1995 | Lal | 428/332 |
| 5,569,533 | 10/1996 | Lal et al. | 428/332 |
| 5,693,426 | 12/1997 | Lee | 428/611 |
| 5,738,945 | 4/1998 | Lal | 428/611 |

OTHER PUBLICATIONS

Chen, T. et al., "Isotropic vs. Oriented Thin Film Media: Choice for Future High Density Magnetic Recording," Paper #FA02 from *Intermag Conference*, Oct. 19–21, 1995, San Antonio, TX.

Johnson, K.E. et al., "In–Plane Anisotropy in Thin–Film Media: Physical Origins of Orientation Ratio (Invited)," *Transactions on Magnetics*. 31:(06) 2721–2727 (1995).

Lal, B.B. et al., "Effect of Very Thin Cr–Underlayer on the Magnetic and Recording Properties of CoCrTa Thin–Film Media," *IEEE Transactions on Magnetics*. 30: (06) 3954–3956 (1994).

Mirzamaani, M. et al., "Orientation Ratio of Sputtered Thin–Film Disks," *J. Appl. Phys.* 67: (67) 4695–4697 (1990).

Ross, C.A. et al., "The Role of Stress–Induced Anisotropy in Longitudinal Thin Film Magnetic Recording Media," *J. Appl. Phys.* 79: (08) 5342–5344 (1996).

*Primary Examiner*—Leszek Kiliman
*Attorney, Agent, or Firm*—Judy M. Mohr; Peter J. Dehlinger

[57] ABSTRACT

An improvement in a magnetic recording medium having an underlayer and a magnetic recording layer is described. The improvement, effective to reduce media anisotropy, includes deposition of a prelayer on the substrate, prior to deposition of the underlayer. The prelayer is deposited to a thickness of between 10–60 Å and is composed of an CoCr-based alloy having a defined saturation magnetization.

20 Claims, 7 Drawing Sheets

MAGNETIC RECORDING MEDIUM HAVING A PRELAYER

This is a continuation-in-part application of co-pending U.S. application Ser. No. 634,895 for "MAGNETIC RECORDING MEDIUM HAVING A MULTILAYER MAGNETIC RECORDING STRUCTURE" filed Jul. 2, 1997, which is a continuation-in-part application of co-pending U.S. application Ser. No. 08/825,471, pending for "MAGNETIC RECORDING MEDIUM HAVING AN INTERLAYER", filed Mar. 28, 1997, pending which is a continuation-in-part of co-pending U.S. application Ser. No. 08/634,895 for "MAGNETIC RECORDING MEDIUM WITH A CRRU UNDERLAYER", filed Apr. 26, 1996, pending.

FIELD OF THE INVENTION

The present invention relates to a magnetic recording medium having a prelayer deposited directly on a substrate prior to deposition of a nonmagnetic underlayer.

REFERENCES

Bhushan, B., "TRIBOLOGY AND MECHANICS OF MAGNETIC STORAGE DEVICES", Chapter 2, Springer-Verlag, 1990.

Chen, T., et al., "*ISOTROPIC vs. ORIENTED THIN-FILM MEDIA: CHOICE FOR FUTURE HIGH DENSITY MAGNETIC RECORDING*", paper presented at 1995 Intermag Conference, San Antonio, Tex., April 1995.

Doerner, M. F., et al., *IEEE Trans. Mag.* 29 (6): 3667 (1993).

Johnson, K. E., et al., *IEEE Trans. Mag.* 31(6): 2721 (1995).

Jorgensen, F., *THE COMPLETE HANDBOOK OF MAGNETIC RECORDING,* TAB Books, Blue Ridge Summit, Pa. (1988).

Kelly, P. E., et al., *IEEE Trans. Mag.* 25(5): 3881–3883 (1989).

Landis, H., et al., *Thin Solid Films,* 222: 1–7 (1992).

Mayo, P. I., et al., *J. Appl. Phys.* 69(8): 4733–4835 (1991).

Mee, C. D. and Daniel, E. D., *MAGNETIC RECORDING VOLUME I: TECHNOLOGY,* McGraw-Hill Book Co., San Francisco (1987).

Ross, C. A., et al., *J. Appl. Phys.* 79(8): 5342 (1996).

BACKGROUND OF THE INVENTION

Longitudinal magnetic recording media of the type for use in computer disc drives are typically prepared by sputtering a chromium underlayer, a cobalt-alloy magnetic layer and a carbon overcoat sequentially onto a heated nickel-phosphorus-coated aluminum substrate which has been circumferentially textured.

Such media are typically characterized by at least three parameters: the remanence thickness product, $M_rt$, the coercivity, $H_c$ and the coercive squareness, S*. These three magnetic parameters are easily measured using a vibrating sample magnetometer.

It is commonly observed that these magnetic properties can vary in magnitude depending on the direction, tangential or radial, measured. A parameter termed orientation ratio, OR, has been defined as a means to quantify the directional nature of these parameters. Orientation ratio is the ratio of either $M_r$, $H_c$ or S*, in the tangential or in-plane circumferential direction to values in the radial direction. The three different orientation ratios will typically maintain the same relative ranking among different media although absolute values may not be identical. Which orientation ratio value reported is often a function of convenience selected based on the magnetometer being used. The remanence orientation ratio ($OR_{Mr}$) and the coercivity orientation ratio ($OR_{HC}$) are most often cited.

Media prepared as described above typically have a higher magnetic remanence, coercivity or coercive squareness in the in-plane circumferential direction compared to the radial direction. Such media are referred to as "oriented" or "anisotropic" and are characterized by having an orientation ratio value unequal to one. For anisotropic media prepared on a circumferentially textured substrate, the orientation ratio can be as high as ten, although typical values are between about 1.1 to 1.5 (Johnson, et al, 1995).

Media anisotropy and its effect on magnetic recording performance have recently been studied (Johnson, et al, 1995; Chen et al., 1995; Ross, et al, 1996). For future higher density recording, isotropic media, that is media with an orientation ratio equal to one, will be particularly advantageous, being superior in signal to media noise at high recording densities (Johnson, et al, 1995). Isotropic media can be deposited on either textured or non-textured substrates, with non-textured or superpolished substrate surfaces offering the advantages of avoiding texture-induced defects, such as so-called 'scratch' anisotropy, and allowing the read-write head to fly at or below sub-microinch levels.

SUMMARY OF THE INVENTION

Accordingly, it is an object of the invention to provide a magnetic recording medium having a reduced anisotropy.

In one aspect, the invention includes an improvement in a magnetic recording medium formed on a rigid substrate and having an underlayer and a magnetic recording layer. The improvement, which is effective to reduce media anisotropy as measured by orientation ratio, includes depositing a prelayer directly on the substrate prior to deposition of the underlayer. The prelayer (i) is composed of a CoCr-based alloy having a saturation magnetization of between 10–50 emu/cm$^3$ and (ii) has a thickness of between 10–60 Å.

In one embodiment, the substrate in the medium is circumferentially textured. In another embodiment, the substrate is polished.

The prelayer and the magnetic layer are formed, in one embodiment, from alloys having the same elemental constituents in different proportions. For example, the alloys are composed of CoCrNiTa, where more specifically, the alloy for the prelayer contains 50–60 atomic percent cobalt, 24–50 atomic percent chromium, 3–10 atomic percent nickel and 1–10 atomic percent tantalum and the magnetic layer is composed of an alloy containing 60–80 atomic percent cobalt, 10–20 atomic percent chromium, 3–10 atomic percent nickel and 2–10 atomic percent tantalum.

In another embodiment, the alloy for use in forming the prelayer and the magnetic layer is an alloy containing cobalt, chromium and tantalum.

The prelayer has a thickness of between about 10–60 Å, and in a preferred embodiment, the prelayer thickness is between 10–30 Å.

The underlayer in the medium is composed of chromium, in one embodiment, or of an alloy containing between about 2–20% ruthenium and remainder chromium, in another embodiment.

In another aspect, the invention includes a method of reducing anisotropy in a magnetic recording medium having an underlayer and a magnetic thin-film layer, deposited sequentially on a substrate. The method includes depositing by sputter deposition, prior to deposition of the underlayer, a prelayer on the substrate. The prelayer (i) is composed of a CoCr-based alloy having a saturation magnetization of between 10–50 emu/cm$^3$ and (ii) has a thickness of between 10–60 Å.

These and other objects and features of the invention will be more fully appreciated when the following detailed description of the invention is read in conjunction with the accompanying drawings.

DETAILED DESCRIPTION OF THE INVENTION

I. Thin-Film Medium

Figure 1:
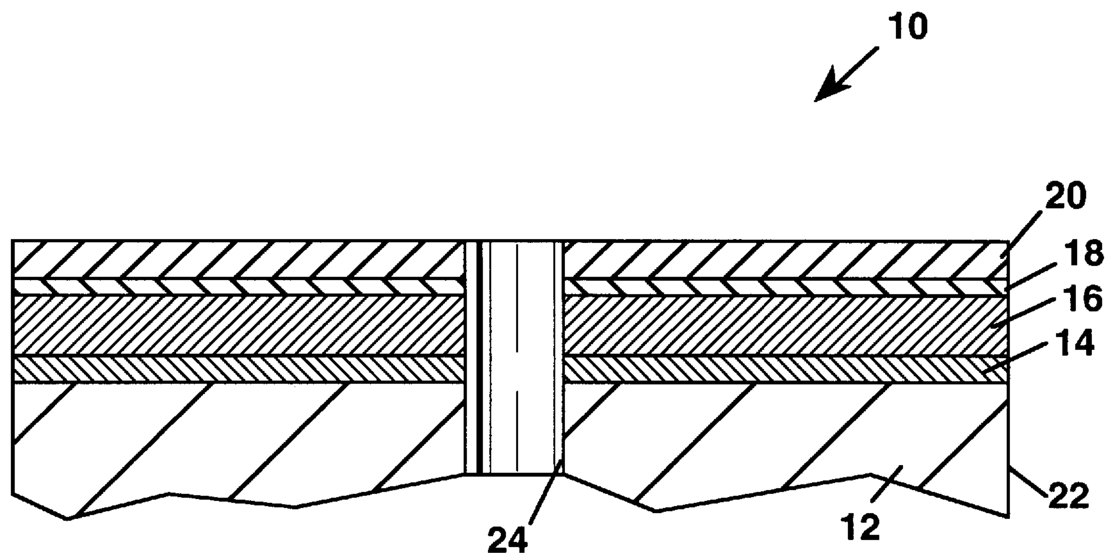
FIG. 1 is a cross-sectional view of a thin-film magnetic recording medium prepared in accordance with the present invention.

FIG. 1 shows in cross sectional view, a fragmentary portion of a longitudinal thin-film medium or disc 10 formed in accordance with the invention. The disc generally includes a rigid substrate 12, and forming successive thin-film layers over the substrate, a prelayer 14 in accordance with the invention and described hereinbelow, an underlayer 16, a magnetic thin-film recording layer 18 and a protective carbon overcoat 20. It will be appreciated that the disc is symmetrical with respect to its upper and lower surfaces, the lower portion of the disc not being shown in the figure.

Substrate 12 may be a textured or non-textured substrate of metal or non-metal, such as glass or ceramic. An example of a metal substrate commonly used for digital recording media is an aluminum substrate plated with a selected alloy, such as nickel-phosphorus (NiP). The plated metal substrate is treated to have a surface texture, that is, a repetitive or random deviation from the nominal surface of the substrate which forms the three-dimensional topography of the surface. Surface texture includes roughness, waviness, lay and flaws (Bhushan, 1990). Substrates are textured, for example, by grinding such as with a rotary abrasive pad, by plasma etching or by chemical etching, as has been described in the art (for example, U.S. Pat. Nos. 5,167,096; 5,119,258; 5,207,759; 5,166,006; 4,735,840). Glass or ceramic substrates can be textured by similar methods after application of a metal sublayer, such as a Ti, Nb, Cr-alloy or NiP sublayer. Substrate texture can be characterized by an average surface roughness parameter ($R_a$), which refers to the variations in height of the surface relative to a reference plane. Typically, such textured substrates have an average surface roughness of between about 3–50 Å.

Substrates having a polished or smooth surface are also suitable for use in the present invention. A polished substrate is one typically having an average roughness of less than about 20 Å. Polished substrates are prepared, for example, by chemical-mechanical polishing (Landis, 1992).

Conventional size substrates have outer diameters of 130 mm (5.25 inches), 95 mm (3.5 inches) or 65 mm (2.5 inches) with corresponding inner diameters of 40 mm (1.57 inches), 25 mm (0.98 inches) and 10 mm (0.79 inches), respectively. A preferred disc for use in the present invention has an inner diameter of 0.984 inches and an outer diameters of 3.74 inches. The inner and outer edges of the disc which define these diameters are indicated at 22, 24, respectively, in FIG. 1.

With continuing reference to FIG. 1, and according to an important aspect of the invention, medium 10 includes a prelayer deposited directly on the substrate. The prelayer is composed of a cobalt/chromium-based (CoCr-based) alloy, which, as used herein refers to an alloy containing at least about 50% cobalt and at least about 24% Cr, preferably 24–50% Cr, more preferably 30–50% Cr and most preferably 30–40% Cr. Importantly, the CoCr-based alloy forming the prelayer has a saturation magnetization of between about 10–50 memu/cm$^3$, which is considerably lower than that of materials used for formation of the magnetic recording layers, such as cobalt, 1430 emu/cm$^3$; nickel 483 emu/cm$^3$ and iron 1710 emu/cm$^3$ (Mee and Daniel, 1987).

Saturation magnetization of magnetic materials can be found in the literature, for example in *MAGNETIC RECORDING VOLUME I: TECHNOLOGY* by Mee and Daniel (1987) or in the literature, such as in the paper by Doerner, et al. (1993) where the saturation magnetization of CoPtCr as a function of Cr concentration is reported. Saturation magnetization values of magnetic materials can also be determined experimentally from the hysteresis loop obtained using a vibrating sample magnetometer, as described, for example, in Jorgensen (1990).

The prelayer is deposited to a thickness of between about 10–60 Å and more preferably between 10–30 Å.

Magnetic media were prepared in support of the present invention, as discussed hereinbelow, with a prelayer composed of CoCrNiTa (53/36/8/3). The relatively high chromium content in the alloy, e.g., greater than about 24%, results in a saturation magnetization considerably less than other cobalt alloys conventionally used for magnetic recording layers, such as CoCrNiTa (72/14/8/6).

In the present invention, a preferred CoCr-based alloy for use in forming the prelayer is a CoCrNiTa alloy containing between 50–60 atomic percent cobalt, 24–50 atomic percent chromium, 5–10 atomic percent nickel, and 1–10 atomic percent tantalum. Another preferred alloy is CoCrTa containing between 50–70 atomic percent cobalt, 24–40 atomic percent chromium and 2–10 atomic percent tantalum.

The alloy composition in the prelayer of the present invention is homogeneous through the thickness of the layer. The prelayer forms a discrete layer on the substrate and has approximately the same alloy composition at the substrate-prelayer boundary as at the prelayer-underlayer boundary.

Underlayer 16 is preferably formed of a nonmagnetic alloy, preferably a chromium-based alloy, which, as used herein includes chromium (Cr) and alloys containing greater than about 80% chromium. Exemplary alloys include CrV, CrSi, CrGd, CrMo and CrRu. In a preferred embodiment, the underlayer is a CrRu alloy containing between about 2–20% ruthenium, more preferably 2–10% ruthenium, and remainder chromium. Alloy percentages reported herein are atomic weight percentages, for example, a 90/10 CrRu alloy refers to an alloy of 90 atomic percent chromium and 10 atomic percent ruthenium.

It will be appreciated that the underlayer, when formed of chromium or of a binary alloy such as CrRu, may also contain minor amounts of other elements. For example, any of the following elements when added in amounts of less than about 5%, preferably less than about 3%, to the CrRu alloy may be suitable for the underlayer of the invention: Si, Cu, Pt, Al, Mo, Ta, Ge, B, Ni, W, V, Hf, Nb, Zr, Ti, Os, Pd, Sb, Nd and C.

The underlayer has a thickness of between about 100–3,000 Å, more preferably between about 150–1,000 Å, most preferably between 200–800 Å.

Magnetic thin-film layer 18 is formed by sputter deposition of a cobalt-based (Co-based) alloy—that is, an alloy containing at least about 50% cobalt. Preferable alloys include cobalt-based alloys containing nickel, platinum and/or tantalum. A preferred alloy is CoCrNiTa having between 70–80 atomic percent cobalt, 10–20 atomic percent chromium, 3–10 atomic percent nickel and 2–10 atomic percent tantalum. The CoCrNiTa alloy used in media prepared in support of the present invention was composed of 72% Co, 14% Cr, 8% Ni and 6% Ta. Another exemplary alloy is CoCrPtTa, composed of 70–90 atomic percent cobalt, 2–20 atomic percent chromium, 3–15 atomic percent platinum and 1–10 atomic percent tantalum. These alloys are characterized by high-coercivity, high magnetic remanence, and low permeability, and are widely used in thin-film longitudinal recording media.

In one embodiment of the invention, the prelayer and the magnetic layer are formed of alloys having the same elemental constituents, but where those constituents are in different proportions. For example, in support of the invention media were prepared with a prelayer of CoCrNiTa (53/36/8/3) and a magnetic recording layer of CoCrNiTa (72/14/8/6).

It will be appreciated that the medium may contain two or more magnetic thin-film layers separated by nonmagnetic isolation layers. For example, the medium may include three, four or more magnetic layers separated by two, three or more interlayers.

Overcoat 20 is composed of a material giving wear-resistant, protective properties to the medium. Preferably, the overcoat is composed of C, Zr, $ZrO_2$, Si, SiC, or $SiO_2$, most preferably of carbon, which may include carbon produced by sputtering in an argon atmosphere containing nitrogen or hydrogen, for an overcoat containing hydrogen and/or nitrogen. The overcoat thickness is preferably between about 50–200 Å.

After sputter deposition of the overcoat, the medium is typically coated with a lubricant, such as a convention, commercially available perfluoropolyether lubricant.

II. Method of Producing the Medium

Figure 2:
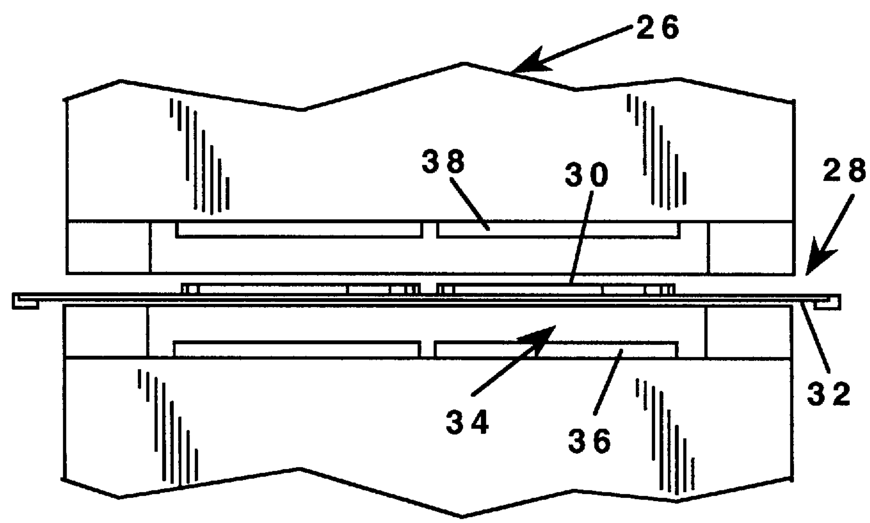
FIG. 2 is a schematic view of a sputtering apparatus used in producing the thin-film medium of the invention.

FIG. 2 shows, in schematic view, a portion of a sputtering apparatus 26 which is used, in the method of the invention, for producing the thin-film medium described in Section I. The apparatus includes a vacuum chamber 28 having at least four stations at which sputtering or heating operations occur. A heating station (not shown) at the upstream end of the chamber has a plurality of infrared lights which are arrayed for heating both sides of a substrate, such as substrate 30, carried through the station in the chamber on an aluminum disc holder or pallet 32.

Just downstream of the heating station is a first sputtering station 34 where a prelayer is formed on a substrate, in a manner to be described. The station includes a pair of targets, such as targets 36, 38, effective to sputter onto opposite sides of substrate 30. The targets in station 34 are composed of a paramagnetic material, such as the CoCr-based materials discussed above. The prelayer is sputtered to a thickness between about 10–60 Å by well-known methods for controlling the thickness of sputtered films in a conventional sputtering apparatus, such as sputter pressure, target power, voltage, deposition time, etc.

A second sputtering station (not shown) downstream of chamber 34 is designed for sputtering the underlayer onto the prelayer. The station includes a pair of sputtering targets, preferably pure chromium targets or chromium alloy targets, containing predominately chromium, such as CrRu 90/10 or CrRu 80/20.

A third sputtering station downstream from the second sputtering chamber is designed for sputtering a magnetic recording layer onto the underlayer. The targets in this station are formed, by conventional metallurgical methods, of a Co-based alloy such as those discussed above.

A fourth sputtering station is included for deposition a protective overcoat onto the medium. The targets in the sputtering station are typically carbon targets, however protective overcoats of silicon or other materials are contemplated.

Also included in the apparatus is a DC power source (not shown) for placing a selected voltage potential between the sputtering targets and the substrate. The power source is designed to place a DC negative bias on the substrate of −50 to −600 volts, measured with respect to target in the sputtering chambers.

The basic sputtering apparatus is preferably a commercial system, such as in available from Varian\Intevac (Santa Clara, Calif.), Circuits Processing Apparatus (Fremont, Calif.), ULVAC (Japan), Leybald Heraeus (Germany), VACTEC (Boulder, Colo.), Anelva (Japan) or Materials Research Corporation (Albany, N.Y.). These systems are double-sided, in-line, high-throughput machines having two interlocking systems, for loading and unloading.

Example 1 describes sputtering conditions for preparation of magnetic media in accordance with the invention. In a typical operation, the sputtering chamber is evacuated to pressure of about $10^{-7}$ Torr, and argon gas is introduced into the chamber to a final sputtering pressure of 5–20 mTorr. The substrate is heated in the heating station to a selected temperature before advancing into the sputtering chambers. The heating conditions in the apparatus are preferably adjusted to achieve a substrate temperature of between about 150° C. and 300° C., and preferably about 270° C.

The heated substrate is moved into the first sputtering chamber, and the prelayer is sputtered onto the disc surface to the desired thickness. The coated substrate is shuttled into the next station for deposition of the underlayer. In support of the present invention, media were prepared having an underlayer of CrRu (90/10) or of chromium, deposited to a selected thickness of typically about 400 Å.

The magnetic layer is deposited in another sputtering chamber by sputtering from a target composed of a cobalt-based alloy, such as those described above. The magnetic layer typically has a thickness of between about 100–800 Å.

III. Media Properties

Magnetic recording media having a prelayer disposed between the substrate and the underlayer, as described above, were prepared in support of the present invention. The magnetic recording media described below were prepared using circumferentially-textured ($R_a$=20 Å) NiP-plated aluminum substrates. The paramagnetic prelayer was deposited directly on the plated substrate, followed by deposition of the underlayer and the magnetic layer. Table 1 in Example 1 provides a summary of the media prepared in support of the invention.

A vibrating sample magnetometer was used to measure static magnetic properties. Magnetic recording characteristics were measured using a Guzik Model RWA 1601, using an inductive write head and a magnetoresistive playback head (shield-to-shield gap=0.7 μm, track width=3.5 μm). The head flying height was 2.2 microinches with a linear disc speed of 8 meter/second.

Table 2A shows static magnetic properties for media prepared with a CoCrNiTa (53/36/8/3) prelayer, a CrRu (90/10) underlayer and a CoCrNiTa (72/14/8/6) magnetic layer. Table 2B shows the properties for media having the same prelayer and underlayer as in the media of Table 2A, but with a magnetic layer of CoCrPtTa (74/17/5/4).

TABLE 2A

| Medium No.* | CoCrNiTa (53/36/8/3) Prelayer Thickness (Å) | CrRu (90/10) Underlayer Thickness (Å) | VSM Data Hc (Oe) | SR | S* | Mrt (memu/cm²) | OR MR | OR Hc |
|---|---|---|---|---|---|---|---|---|
| 1 | 0 | 350 | 2738 | 0.85 | 0.60 | 0.87 | 1.17 | 1.17 |
| 2 | 30 | 350 | 2721 | 0.82 | 0.82 | 0.83 | 1.06 | 1.11 |
| 3 | 60 | 350 | 2545 | 0.83 | 0.83 | 0.75 | 0.92 | 1.04 |
| 4 | 120 | 350 | 2383 | 0.80 | 0.82 | 0.72 | 0.91 | 1.01 |

*magnetic layer composed of CoCrNiTa (72/14/8/6).

TABLE 2B

| Medium No.* | CoCrNiTa (53/36/8/3) Prelayer Thickness (Å) | CrRu (90/10) Underlayer Thickness (Å) | VSM Data | | | | | |
|---|---|---|---|---|---|---|---|---|
| 5 | 0 | 350 | 2851 | 0.88 | 0.77 | 0.83 | 1.20 | 1.20 |
| 6 | 30 | 350 | 2782 | 0.82 | 0.84 | 0.77 | 1.09 | 1.12 |
| 7 | 60 | 350 | 2728 | 0.84 | 0.84 | 0.71 | 0.95 | 1.06 |
| 8 | 120 | 350 | 2520 | 0.82 | 0.83 | 0.70 | 0.94 | 1.03 |

*magnetic layer composed of CoCrPtTa (74/17/5/4).

The data in Tables 2A and 2B indicate that the static magnetic properties, coercivity ($H_c$), squareness ratio (SR), coercive squareness (S*) and magnetic remanence thickness ($M_rt$) remain at acceptable levels for magnetic recording when compared to media lacking a prelayer (media nos. 1 and 5). Importantly, the prelayer is effective to reduce the anisotropy, as evidenced by the orientation ratio approaching a value of one in the prelayer thickness range of about 10–60 Å.

Figure 3A:
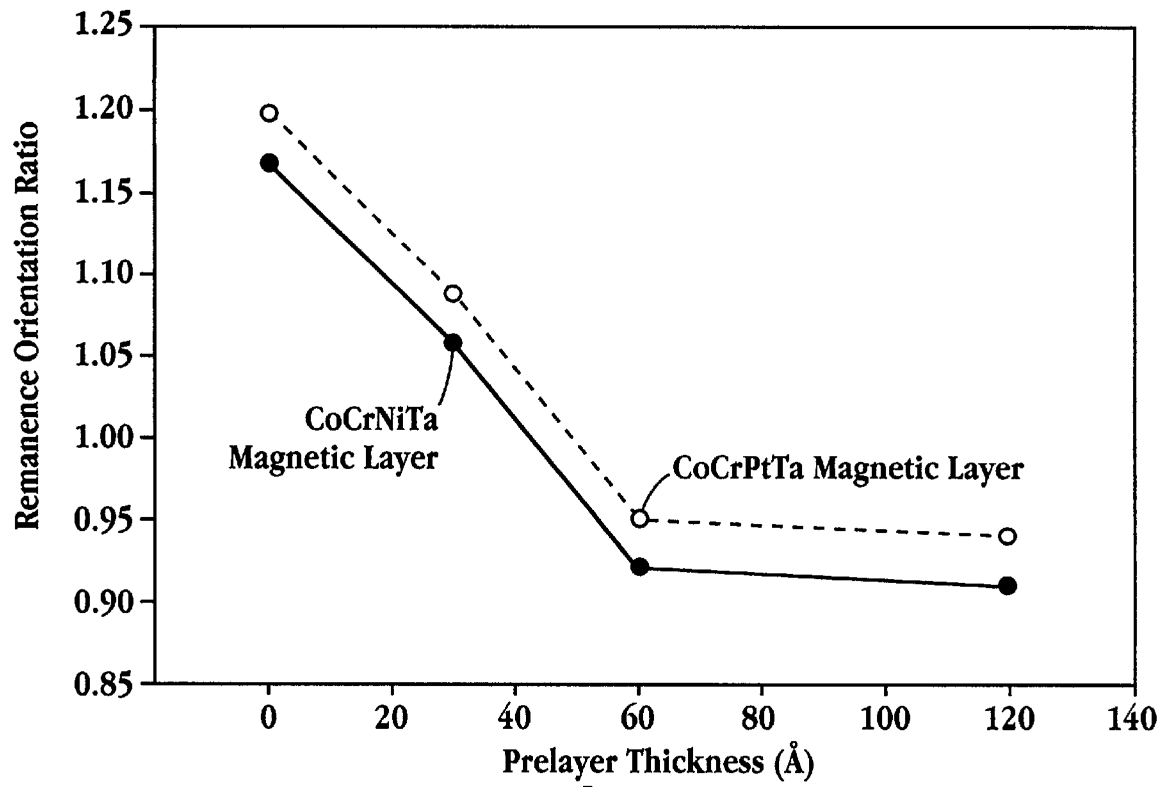
FIGS. 3A–3B are plots of remanence orientation ratio (FIG. 3A) and coercivity orientation ratio (FIG. 3B) as a function of prelayer thickness, in Å, for media having a CoCrNiTa (53/36/8/3) prelayer, a CrRu underlayer and a CoCrNiTa (72/14/8/6) magnetic layer (●, media nos. 1–4) or a CoCrPtTa (74/17/5/4) magnetic layer (○, media nos. 5–8)
Figure 3B:
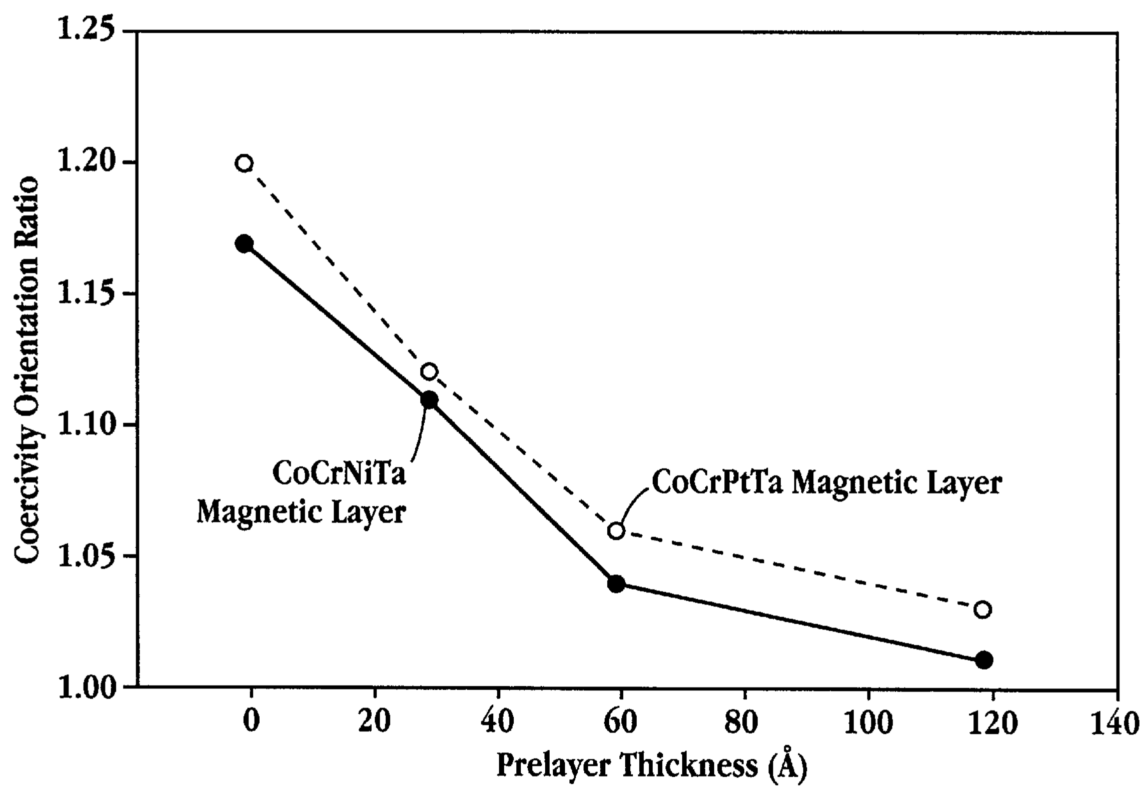

The orientation ratios reported in Tables 2A and 2B are plotted in FIGS. 3A–3B, with the remanence orientation ratio shown in FIG. 3A and the coercivity orientation ratio shown in FIG. 3B, as a function of prelayer thickness. As seen in the figures, the trend of decreasing orientation ratio with thickness of the prelayer up to about 60 Å is observed for media having a CoCrNiTa (72/14/8/6) magnetic layer (●, media nos. 1–4) and for media having a CoCrPtTa (74/17/5/4) magnetic layer (○, media nos. 5–8).

Tables 3A and 3B show static magnetic properties for media having a CoCrNiTa (53/36/8/3) prelayer, a Cr underlayer and a magnetic layer of CoCrNiTa (72/14/8/6) (Table 3A) or of CoCrPtW (74/14/8/4) (Table 3B).

TABLE 3A

| Medium No.* | CoCrNiTa (53/36/8/3) prelayer Thickness (Å) | Cr Underlayer Thickness (Å) | VSM Data Hc (Oe) | SR | S* | Mrt (memu/cm²) | OR MR | OR Hc |
|---|---|---|---|---|---|---|---|---|
| 9 | 0 | 375 | 2694 | 0.85 | 0.84 | 0.98 | 1.44 | 1.34 |
| 10 | 20 | 375 | 2601 | 0.83 | 0.82 | 0.93 | 1.23 | 1.17 |
| 11 | 30 | 375 | 2477 | 0.86 | 0.80 | 0.83 | 0.98 | 1.06 |
| 12 | 40 | 375 | 2388 | 0.84 | 0.72 | 0.85 | 0.96 | 1.04 |
| 13 | 60 | 375 | 2389 | 0.84 | 0.74 | 0.77 | 0.86 | 1.00 |

*magnetic layer composed of CoCrNiTa (74/14/8/6).

TABLE 3B

| Medium No.* | CoCrNiTa (53/36/8/3) Prelayer Thickness (Å) | Cr Underlayer Thickness (Å) | VSM Data Hc (Oe) | SR | S* | Mrt (memu/cm²) | OR MR | OR Hc |
|---|---|---|---|---|---|---|---|---|
| 14 | 0 | 375 | 2573 | 0.84 | 0.80 | 0.93 | 1.34 | 1.51 |
| 15 | 20 | 375 | 2723 | 0.94 | 0.85 | 0.93 | 1.29 | 1.27 |
| 16 | 30 | 375 | 2774 | 0.90 | 0.82 | 0.86 | 1.08 | 1.13 |
| 17 | 40 | 375 | 2690 | 0.86 | 0.84 | 0.88 | 1.05 | 1.10 |
| 18 | 60 | 375 | 2662 | 0.85 | 0.86 | 0.85 | 0.96 | 1.07 |

*magnetic layer composed of CoCrPtW (74/14/8/4).

Figure 4A:
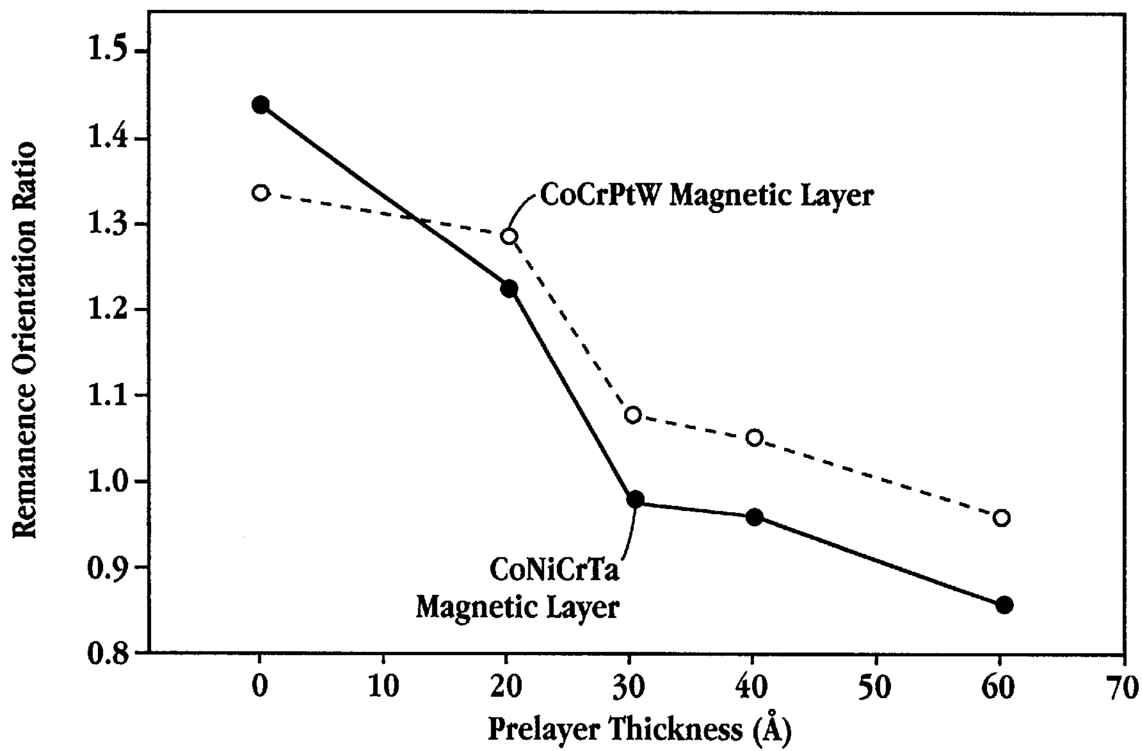
FIGS. 4A–4B are plots of remanence orientation ratio (FIG. 4A) and coercivity orientation ratio (FIG. 4B) as a function of prelayer thickness, in Å, for media having a CoCrNiTa (53/36/8/3) prelayer, a Cr underlayer and a CoCrNiTa (72/14/8/6) magnetic layer (●, media nos. 9–13) or a CoCrPtW (74/14/8/4) magnetic layer (○, media nos. 14–18)
Figure 4B:
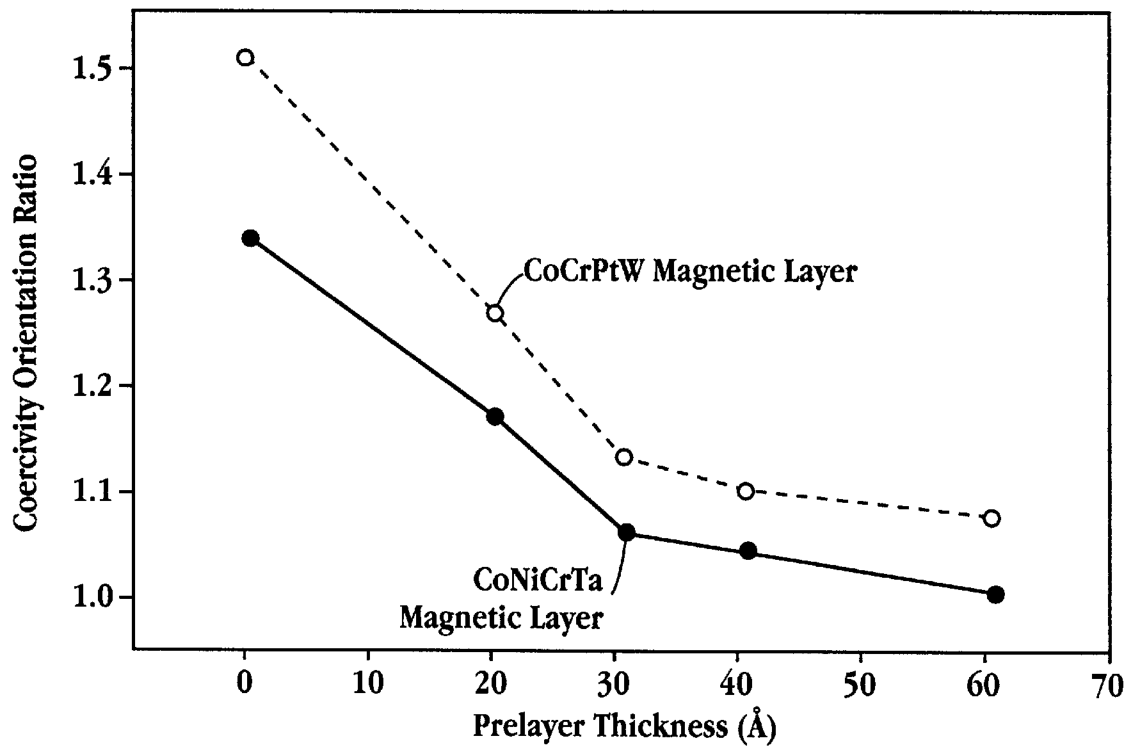

The data in Tables 3A and 3B show that for media having a chromium underlayer and a Co-based magnetic layer, a prelayer is effective to improve orientation ratio, that is to reduce media anisotropy, or in other words to form a more isotropic medium where the magnetic properties are more uniform across the surface of the medium. The orientation ratio values tabulated in Tables 3A and 3B are plotted in FIGS. 4A–4B, where FIG. 4A shows remanence orientation ratio and FIG. 4B shows coercivity orientation ratio, both as a function of prelayer thickness. In the figures, media having a CoCrNiTa (72/14/8/6) magnetic layer are represented by a closed circle (●, media nos. 9–13) and media having a magnetic layer of CoCrPtW (74/14/8/4) are represented by open circles (○, media nos. 14–18).

Figure 5A:
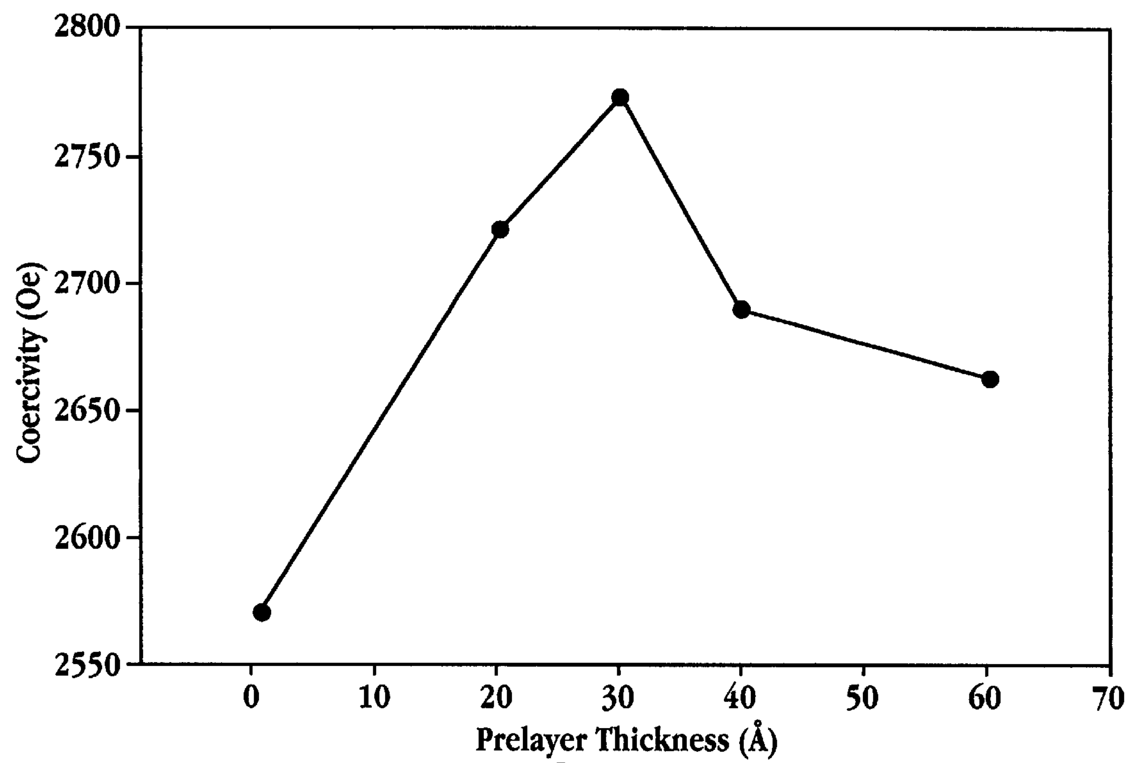
FIGS. 5A–5B are plots of coercivity (FIG. 5A) and squareness ratio (●) and coercivity squareness (■) (FIG. 5B) as a function of prelayer thickness, in Å, for media having a CoCrNiTa (53/36/8/3) prelayer, a Cr underlayer and a CoCrPtTa (74/17/5/4) magnetic layer (media nos. 14–18)
Figure 5B:
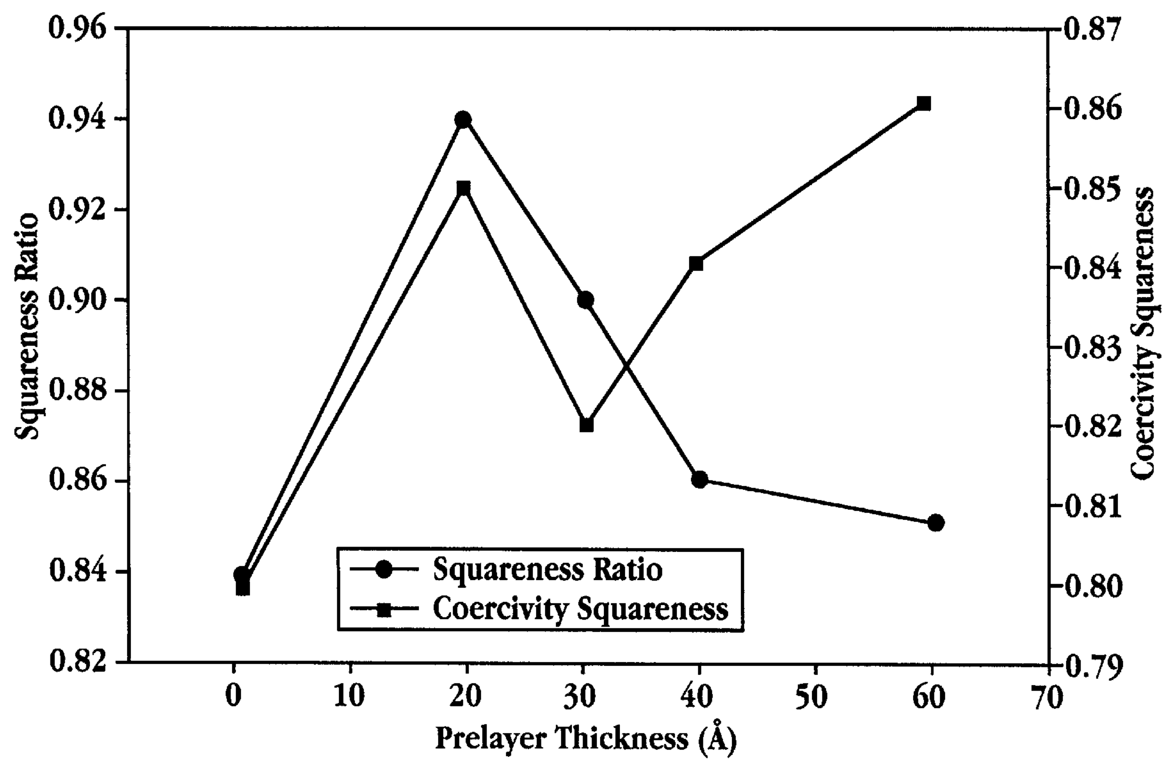

At the same time, other magnetic recording properties remain at levels acceptable for magnetic recording. In fact, as seen in Table 3B and as shown in FIG. 5A, the prelayer is effective to improve coercivity for media prepared with a CoCrPtW magnetic layer (media nos. 14–18, Table 3B). FIG. 5B is a plot showing that the prelayer is effective to improve squareness ratio (●) and coercivity squareness (■) (media nos. 14–18, Table 3B).

To demonstrate that for optimum results the prelayer is preferably composed of a paramagnetic alloy having a saturization magnetization between 10–50 memu/cm³, comparative media were prepared having a prelayer composed of a magnetic alloy, CoCrNiTa (72/14/8/6). As discussed above, the chromium content in the alloy for use as the prelayer contains preferably at least about 24% chromium. The comparative alloy prelayer contains 14% chromium and is magnetic in nature rather than paramagnetic.

Tables 4A and 4B summarize data for comparative media prepared with a magnetic prelayer of CoCrNiTa (72/14/8/6), a CrRu underlayer (90/10) and a magnetic layer of CoCrNiTa (72/14/8/6) (Table 4A) or of CoCrPtTa (74/17/5/4) (Table 4B).

TABLE 4A

Comparative Media

| Medium No.* | Comparative PreLayer of CoCrNiTa (72/14/8/6) Thickness (Å) | CrRu (90/10) Underlayer Thickness (Å) | VSM Data Hc (Oe) | SR | S* | Mrt (memu/cm²) | OR MR | OR Hc |
|---|---|---|---|---|---|---|---|---|
| 19 | 0 | 350 | 2135 | 0.82 | 0.74 | 0.87 | 1.13 | 1.22 |
| 20 | 20 | 350 | 2125 | 0.81 | 0.71 | 0.88 | 1.15 | 1.24 |
| 21 | 30 | 350 | 2097 | 0.81 | 0.76 | 0.87 | 1.16 | 1.21 |

TABLE 4A-continued

Comparative Media

| Medium No.* | Comparative PreLayer of CoCrNiTa (72/14/8/6) Thickness (Å) | CrRu (90/10) Underlayer Thickness (Å) | VSM Data Hc (Oe) | SR | S* | Mrt (memu/cm$^2$) | OR MR | OR Hc |
|---|---|---|---|---|---|---|---|---|
| 22 | 40 | 350 | 2039 | 0.76 | 0.74 | 0.86 | 1.08 | 1.15 |
| 23 | 60 | 350 | 1869 | 0.73 | 0.55 | 0.85 | 1.04 | 1.11 |

*magnetic layer composed of CoCrNiTa (72/14/8/6).

TABLE 4B

Comparative Media

| Medium No.* | Comparative Prelayer (CoCrNiTa (72/14/8/6) Thickness (Å) | CrRu (90/10) Underlayer Thickness (Å) | VSM Data Hc (Oe) | SR | S* | Mrt (memu/cm$^2$) | OR MR | OR Hc |
|---|---|---|---|---|---|---|---|---|
| 24 | 0 | 350 | 2252 | 0.80 | 0.65 | 0.91 | 1.16 | 1.28 |
| 25 | 20 | 350 | 2290 | 0.79 | 0.74 | 0.92 | 1.12 | 1.24 |
| 26 | 30 | 350 | 2310 | 0.83 | 0.77 | 0.94 | 1.19 | 1.21 |
| 27 | 40 | 350 | 2276 | 0.80 | 0.65 | 0.91 | 1.16 | 1.16 |
| 28 | 60 | 350 | 2021 | 0.75 | 0.61 | 0.92 | 1.03 | 1.19 |

*magnetic layer composed of CoCrPtTa (74/17/5/4).

Figure 6A:
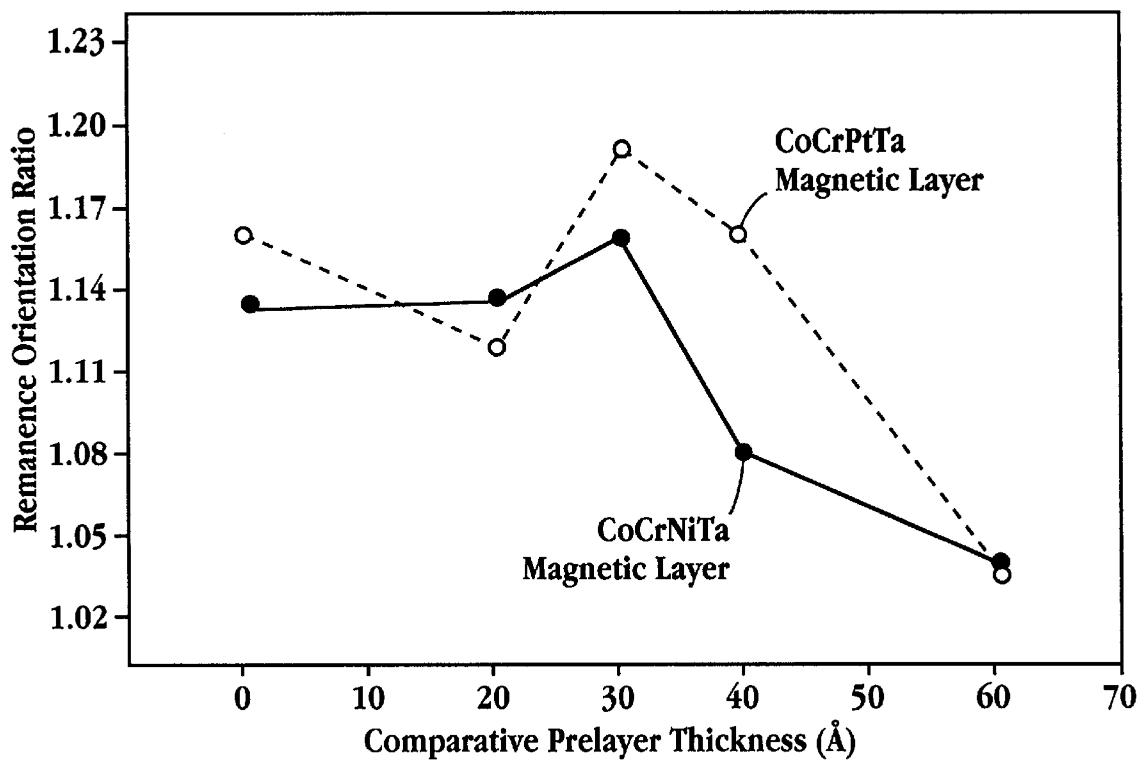
FIGS. 6A–6B are plots of remanence orientation ratio (FIG. 6A) and coercivity orientation ratio (FIG. 6B) as a function of prelayer thickness, in Å, for comparative media having a CoCrNiTa (72/14/8/6) prelayer, a CrRu underlayer and a CoCrNiTa (72/14/8/6) magnetic layer (●, media nos. 19–23) or a CoCrPtTa (74/17/5/4) magnetic layer (○, media nos. 24–28)
Figure 6B:
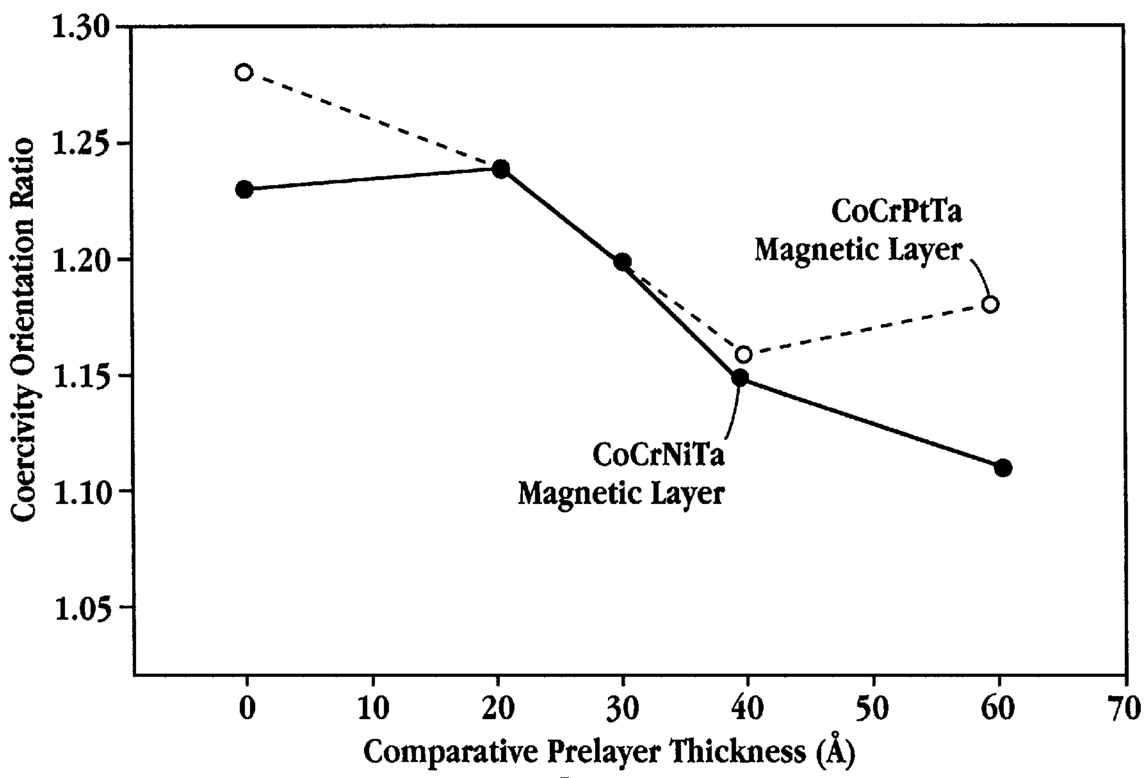

The orientation ratio values shown in Tables 4A and 4B are plotted in FIGS. 6A–6B, where the remanence orientation ratio (FIG. 6A) and coercivity orientation ratio (FIG. 6B) are shown as a function of comparative prelayer thickness. In the figures, media having a CoCrNiTa (72/14/8/6) magnetic layer are represented by a closed circle (●, media nos. 19–23) and media having a CoCrPtTa (74/17/5/4) magnetic layer (○, media nos. 24–28). As seen, a magnetic prelayer in the thickness range of 10–60 Å is less effective in reducing media anisotropy, relative to a paramagnetic prelayer. This is seen by comparing the data presented in Tables 2A and 2B with the data in Tables 4A and 4B, respectively. For example, media having an underlayer of CrRu (90/10) and a magnetic layer of CoCrNiTa (72/14/8/6) have a remanence orientation ratio of 1.17 (Table 2A). Deposition of a paramagnetic prelayer (CoCrNiTa 53/36/8/3) is effective to reduce remanence orientation ratio, and at a prelayer thickness of somewhere between 30–60 Å, the remanence orientation ratio reaches a value of one (Table 2A). In comparison, for media composed of the same underlayer (CrRu 90/10) and magnetic layer (CoCrNiTa 72/14/8/6), but having a magnetic prelayer (CoCrNiTa 72/14/8/6) (Table 4A), the prelayer is less effective in reducing anisotropy, as the remanence orientation ratio has not yet reached a value of one at a prelayer thickness of 60 Å. A similar conclusion can be observed by comparing coercivity orientation ratios in Tables 2A and 4A and by comparing the remanence and coercivity orientation ratios in Tables 2B to those in Table 4B.

The magnetic interactions between grains in a thin film medium can be measured in terms of a parameter termed ΔM, as has been described (Kelly, et al., 1989; Mayo, et al., 1991). ΔM provides a measure of the interaction strength in a material and can be used to determine the nature of coupling. A positive value of ΔM is associated with intergraular exchange coupling or ferromagnetic interaction whereas negative values of ΔM arise from dipolar type magnetostatic interaction which tend to assist magnetization reversal of the grains. The peak value of ΔM can be correlated to the noise in the thin film medium.

Figure 7A:
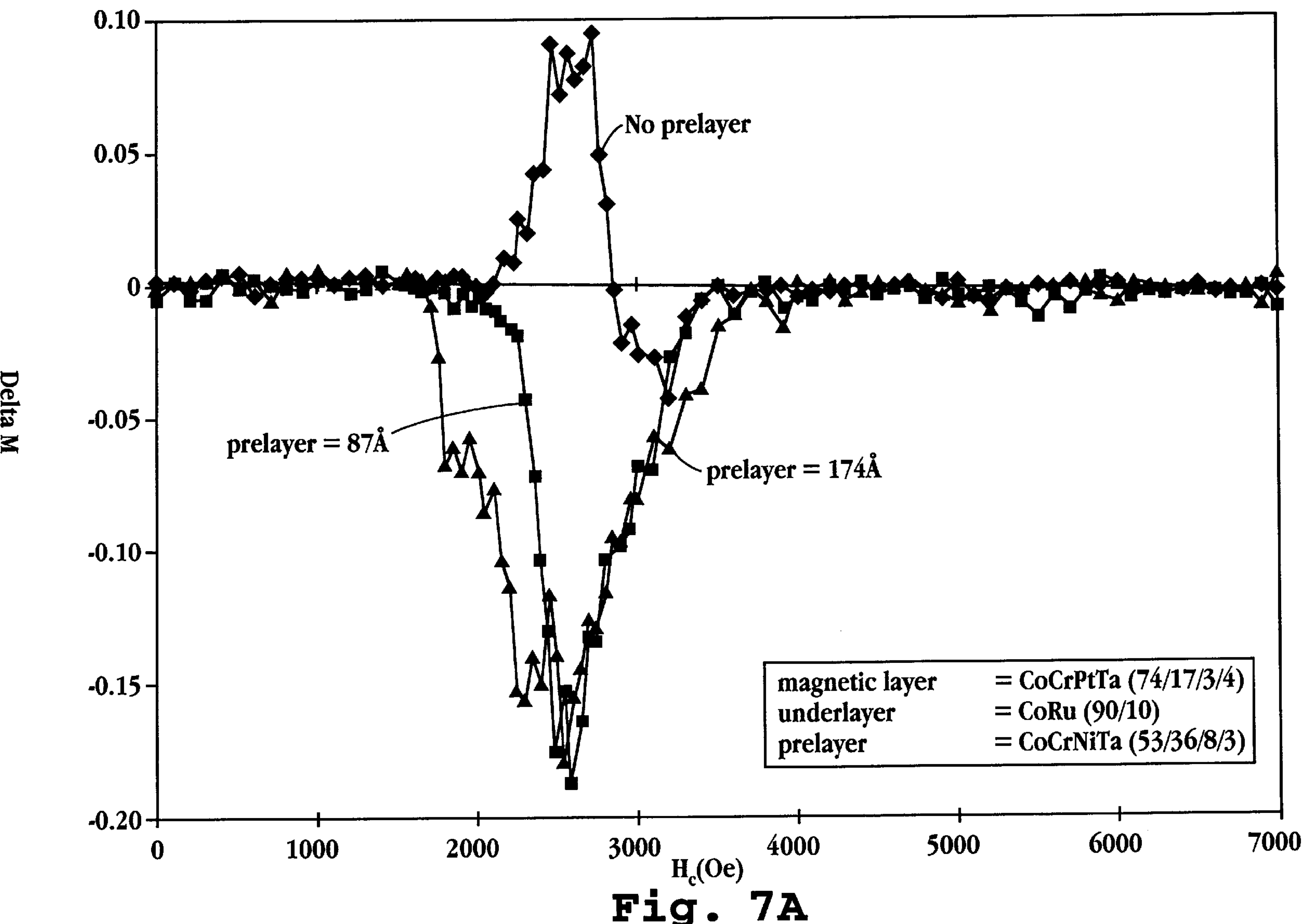
FIG. 7A is a plot of $\Delta M$ as a function of coercivity, in Oe, for media having a magnetic layer of CoCrPtTa (74/17/5/4), a CrRu underlayer and no prelayer (♦) or a prelayer of CoCrNiTa (53/36/8/3) of thickness 87 Å (■) or 174 (▲)

FIG. 7A is a plot of ΔM as a function of coercivity for media having a magnetic layer of CoCrPtTa (74/17/5/4), a CrRu (90/10) underlayer, and no prelayer (♦) or a prelayer of CoCrNiTa (53/36/8/3) of thickness 87 Å (■) or 174 Å (▲).

Figure 7B:
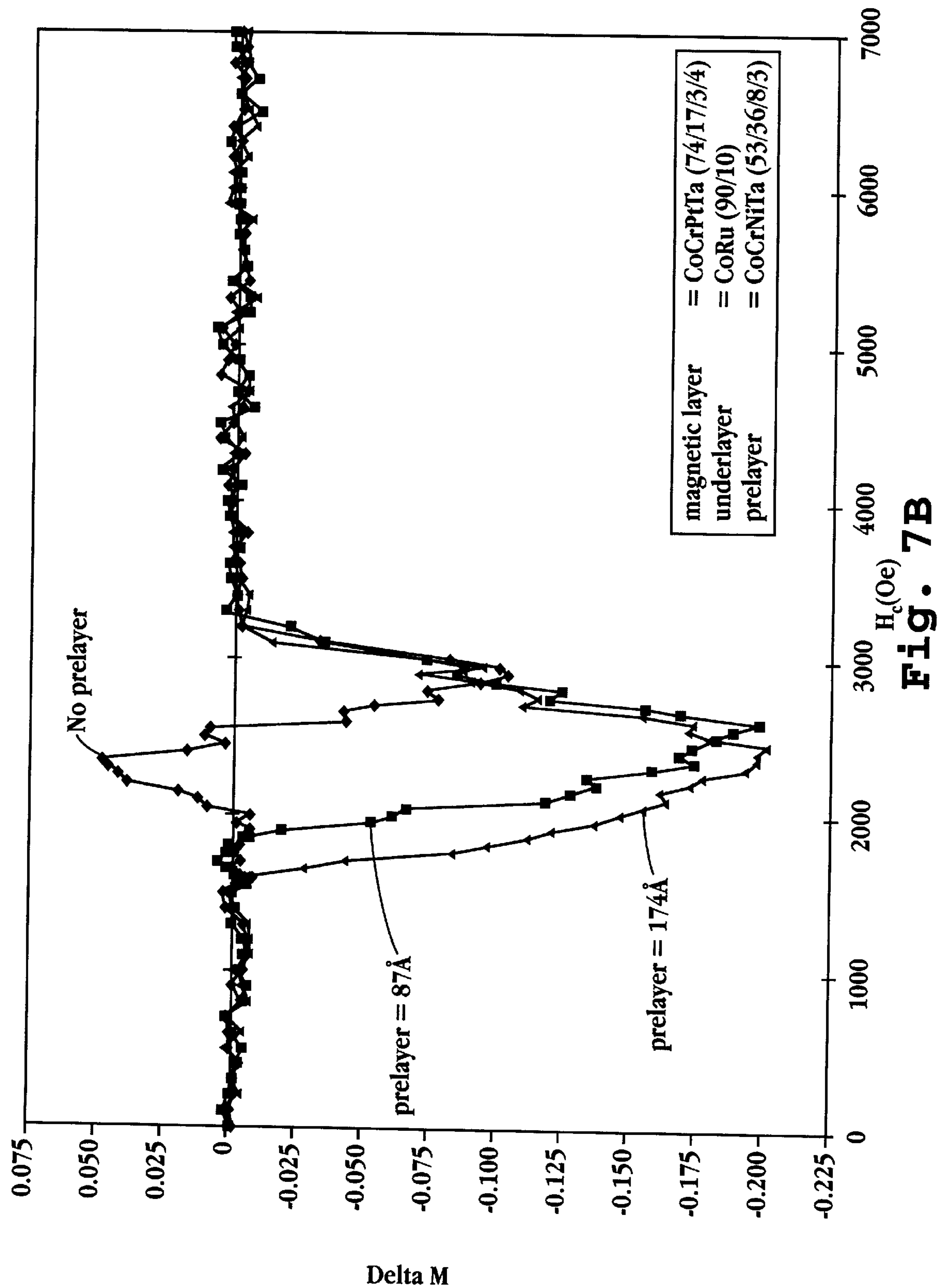
FIG. 7B is a plot of $\Delta M$ as a function of coercivity, in Oe, for media having a magnetic layer of CoCrNiTa (72/14/8/6), a CrRu underlayer and no prelayer (♦) or a prelayer of CoCrNiTa (53/36/8/3) of thickness 87 Å (■) or 174 (▲).

FIG. 7B is a plot of ΔM as a function of coercivity, in Oe, for media having a CrRu underlayer and a magnetic layer of CoCrNiTa (72/14/8/6) and no prelayer (♦) or a prelayer of CoCrNiTa (53/36/8/3) of thickness 87 Å (■) or 174 Å (▲).

In both of these figures, the media lacking a prelayer show a sharp increase in ΔM with increasing field, followed by a sharp collapse of the interaction curve and a small negative region of ΔM. This curve is consistent with exchange interaction between grains, where the interactions initially stabilize the magnetized state followed by rapid bulk cooperative switching of many grains above a critical field. The ΔM values for the media having a prelayer indicates that the prelayer is effective to reduce exchange interactions.

From the foregoing, it can be appreciated how various objects and features on the invention are met. The invention provides an improvement in a magnetic recording medium by including in the medium a prelayer disposed between the substrate and the underlayer. The prelayer is composed of a CoCr-based alloy having a saturation magnetization substantially below that normally preferred for magnetic recording, e.g., between about 10–50 memu/cm$^3$. The prelayer is deposited to a thickness between about 10–60 Å and is homogeneous in alloy composition through the layer thickness. The prelayer is effective to reduce circumferential/radial anisotropy of media formed on a textured substrate or on a non-textured substrate. The reduction in anisotropy is evidenced by the measured orientation ratio approaching a value of one, indicative of isotropic media.

The features of the present invention are illustrated with media having a prelayer of CoCrNiTa, an underlayer of Cr or CrRu, and a magnetic layer of CoCrNiTa, CoCrPtTa or CoCrPtW. It will be appreciated that one of skill in the art can readily determine other alloys suitable for the prelayer, the underlayer and the magnetic layer.

IV. EXAMPLES

The following example illustrates preparation of magnetic media having a prelayer, in accordance with the invention, an underlayer, a magnetic recording layer and a protective overcoat. The example is in no way intended limit the scope of the invention.

EXAMPLE 1

Preparation of Magnetic Recording Media

Magnetic recording media for the experiments conducted in support of the invention were prepared using a DC-magnetron Intevac MDP-250B sputtering apparatus as follows.

Nickel-phosphorus plated aluminum substrates (95 mm×31.5 mil) were circumferentially textured to an average surface roughness of 20 Å by mechanical texturing. The textured substrates were loaded into the sputtering apparatus and heated to 270° C. using quartz heating lamps. The prelayer was deposited in a first sputtering chamber, from a magnetic alloy target corresponding to the layer composition as indicated in Table 1 below, at a sputtering pressure of 4.5 mTorr. The underlayer, of CrRu (90/10) or of Cr, as indicated, was deposited in a second sputtering chamber at a sputtering pressure of 8 mTorr. In subsequent sputtering chambers, at pressures of 4.5 mTorr, the magnetic layer, having the composition as indicated in the Table, and a protective carbon overcoat were deposited.

TABLE 1

Summary of Media Prepared

| Media Nos. | Prelayer | Underlayer | Magnetic Layer | Overcoat | Cross Reference |
|---|---|---|---|---|---|
| 1–4 | CoCrNiTa (53/36/8/3) | CrRu (90/10) | CoCrNiTa (72/14/8/6) | C | Table 2A, FIGS. 3A, 3B |
| 5–8 | CoCrNiTa (53/36/8/3) | CrRu (90/10) | CoCrPtTa (74/17/5/4) | C | Table 2B, FIGS. 3A, 3B |
| 9–13 | CoCrNiTa (53/36/8/3) | Cr | CoCrNiTa (72/14/8/6) | C | Table 3A, FIGS. 4A, 4B |
| 14–18 | CoCrNiTa (53/36/8/3) | Cr | CoCrPtW (74/14/8/4) | C | Table 3B, FIGS. 4A, 4B, 5A, 5B |
| 19–23 | CoCrNiTa (72/14/8/6) | CrRu (90/10) | CoCrNiTa (72/14/8/6) | C | Table 4A, FIGS. 6A, 6B |
| 24–28 | CoCrNiTa (72/14/8/6) | CrRu (90/10) | CoCrPtTa (74/17/5/4) | C | Table 4B, FIGS. 6A, 6B |

Although the invention has been described with respect to particular embodiments, it will be apparent to those skilled in the art that various changes and modifications can be made without departing from the invention.

It is claimed:

1. An improvement in a magnetic recording medium formed on a rigid substrate and having an underlayer and a magnetic recording layer, said improvement comprising a prelayer deposited on the substrate prior to deposition of said underlayer, said prelayer (i) composed of a CoCr-based alloy having a saturation magnetization of between 10–50 emu/cm$^3$ and (ii) having a thickness of between 10–60 Å.

2. The medium of claim 1, wherein said substrate is circumferentially textured.

3. The medium of claim 1, wherein said substrate is a polished substrate.

4. The medium of claim 1, wherein said prelayer and said magnetic layer are formed from alloys having the same elemental constituents in different proportions.

5. The medium of claim 4, wherein said alloys are CoCrNiTa.

6. The medium of claim 4, wherein said prelayer is composed of a CoCr-based alloy containing 50–60 atomic percent cobalt, 24–50 atomic percent chromium, 3–10 atomic percent nickel and 1–10 atomic percent tantalum and said magnetic layer is composed of an alloy containing 60–80 atomic percent cobalt, 10–20 atomic percent chromium, 3–10 atomic percent nickel and 2–10 atomic percent tantalum.

7. The medium of claim 4, wherein said alloys are composed of cobalt, chromium and tantalum.

8. The medium of claim 1, wherein said prelayer has a thickness of between 10–30 Å.

9. The medium of claim 1, wherein said underlayer is composed of chromium.

10. The medium of claim 1, wherein said underlayer is composed of an alloy containing between about 2–20% ruthenium and remainder chromium.

11. A method of reducing anisotropy in a magnetic recording medium having an underlayer and a magnetic thin-film layer deposited sequentially on a substrate, said method comprising prior to sputtering said underlayer, depositing by sputter deposition a prelayer on said substrate, said prelayer (i) composed of a CoCr-based alloy having a saturation magnetization of between 10–50 emu/cm$^3$ and (ii) having a thickness of between 10–60 Å.

12. The method of claim 11, wherein said substrate is circumferentially textured.

13. The method of claim 11, wherein said substrate is a polished substrate.

14. The method of claim 11, wherein said prelayer and said magnetic layer are formed from alloys having the same elemental constituents in different proportions.

15. The method of claim 14, wherein said alloys are CoNiCrTa.

16. The method of claim 15, wherein said prelayer is composed of an alloy containing 50–60 atomic percent cobalt, 24–50 atomic percent chromium, 3–10 atomic percent nickel and 1–10 atomic percent tantalum and said magnetic layer is composed of an alloy containing 60–80 atomic percent cobalt, 10–20 atomic percent chromium, 3–10 atomic percent nickel and 2–10 atomic percent tantalum.

17. The method of claim 12, wherein said alloys are composed of cobalt, chromium and tantalum.

18. The method of claim 11, wherein said prelayer has a thickness of between 10–30 Å.

19. The method of claim 11, wherein said underlayer is composed of chromium.

20. The method of claim 11, wherein said underlayer is composed of an alloy containing between about 2–20% ruthenium and remainder chromium.

* * * * *